US012454930B2

(12) United States Patent
Gunturu et al.

(10) Patent No.: US 12,454,930 B2
(45) Date of Patent: Oct. 28, 2025

(54) FUEL FEED FOR MOTOR-DRIVEN HIGH PRESSURE FUEL PUMP

(71) Applicant: Stanadyne Operating Company LLC, Jacksonville, NC (US)

(72) Inventors: Srinu Gunturu, Jacksonville, NC (US); Michael Hornby, Emerald Isle, NC (US); Donald Holder, Hubert, NC (US); Clark Klyza, Jacksonville, NC (US); James Bennardi, Whitmore Lake, MI (US)

(73) Assignee: Stanadyne Operating Company LLC, Jacksonville, NC (US)

( * ) Notice: Subject to any disclaimer, the term of this patent is extended or adjusted under 35 U.S.C. 154(b) by 0 days.

(21) Appl. No.: 18/687,151

(22) PCT Filed: Aug. 26, 2022

(86) PCT No.: PCT/US2022/041644
§ 371 (c)(1),
(2) Date: Feb. 27, 2024

(87) PCT Pub. No.: WO2023/028295
PCT Pub. Date: Mar. 2, 2023

(65) Prior Publication Data

US 2025/0116247 A1 Apr. 10, 2025

Related U.S. Application Data

(60) Provisional application No. 63/237,816, filed on Aug. 27, 2021.

(51) Int. Cl.
*F02M 37/08* (2006.01)
*F02M 51/04* (2006.01)
(Continued)

(52) U.S. Cl.
CPC ............ *F02M 37/08* (2013.01); *F02M 51/04* (2013.01); *F02M 53/00* (2013.01);
(Continued)

(58) Field of Classification Search
CPC ........ F02M 37/08; F02M 37/14; F02M 51/04; F02M 53/00; F02M 59/464;
(Continued)

(56) References Cited

U.S. PATENT DOCUMENTS 8,579,611 B2 11/2013 Lucas
8,714,942 B2 5/2014 Lutoslawski et al.
(Continued)

FOREIGN PATENT DOCUMENTS

| | | | | |
|---|---|---|---|---|
| DE | 102011089281 A1 * | 6/2013 | ......... | F02D 41/3845 |
| JP | 2003184683 A | 7/2003 | | |
| WO | WO-2022053328 A1 * | 3/2022 | ............. | F02M 55/04 |

OTHER PUBLICATIONS

PCT International Search Report and Written Opinion for International Application No. PCT/US2022/041644 filed on Aug. 26, 2022; Date of Mailing: Dec. 21, 2022, 12 pgs.

*Primary Examiner* — Grant Moubry
*Assistant Examiner* — James G Moubry
(74) *Attorney, Agent, or Firm* — Alix, Yale & Ristas, LLP

(57) ABSTRACT

An electric GDI pump is configured to allow fuel being pumped to cool the electric motor and associated motor control/drive circuit, and cool and lubricate a drive region of a high-pressure pump before passing through an inlet check valve of the high-pressure pump. The rotational speed of an electric GDI pump is de-coupled from the rotational speed of the internal combustion engine. In such a fuel supply system, the quantity of fuel pressurized can be regulated by changing the rotational speed of the electric GDI pump.
(Continued)

According to aspects of the disclosure an electric GDI pump is driven by a variable speed direct current motor having a motor housing with a fuel inlet and a motor drive shaft connected to a rotor. The electric GDI pump may incorporate a low-pressure pump driven by one end of the drive shaft and an eccentric drive driven by an opposite end of the drive shaft.

17 Claims, 7 Drawing Sheets

(51) Int. Cl.

| | |
|---|---|
| ***F02M 53/00*** | (2006.01) |
| ***F02M 59/46*** | (2006.01) |
| ***F02M 63/00*** | (2006.01) |
| *F01P 3/00* | (2006.01) |

(52) U.S. Cl.
CPC ...... *F02M 59/464* (2013.01); *F02M 63/0001* (2013.01); *F01P 2003/005* (2013.01)

(58) Field of Classification Search
CPC . F02M 63/0001; F10P 3/00; F10P 3/12; F10P 7/14; F10P 2003/005
See application file for complete search history.

(56) References Cited

U.S. PATENT DOCUMENTS

| | | | | |
|---|---|---|---|---|
| 9,587,578 | B2 | 3/2017 | Surnilla et al. | |
| 2012/0143475 | A1 | 6/2012 | Ryoo et al. | |
| 2013/0192563 | A1 | 8/2013 | Oki | |
| 2014/0064989 | A1 * | 3/2014 | Sato | F04B 23/06 417/251 |
| 2015/0337753 | A1 * | 11/2015 | Stickler | F02M 63/0245 123/506 |
| 2019/0162141 | A1 | 5/2019 | Pellini | |
| 2020/0095963 | A1 * | 3/2020 | Fujiseki | B60K 15/03006 |
| 2020/0116141 | A1 | 4/2020 | Fitzner et al. | |
| 2024/0134186 | A1 * | 4/2024 | Hornby | B60S 1/481 |

* cited by examiner

FUEL FEED FOR MOTOR-DRIVEN HIGH PRESSURE FUEL PUMP

BACKGROUND

The present application relates to high pressure fuel pumps for delivering pressurized fuel to fuel injectors of an internal combustion engine. More particularly, the application relates to a high-pressure fuel pump driven by a variable speed electric motor, where fuel being pumped is drawn through the electric motor into the pump, where it is pressurized before passing through a high pressure outlet of the pump.

Fuel injection systems inject fuel at high pressure directly into engine cylinders in a direct injection (DI) system or at lower pressure into air passages leading to the engine cylinders in a port injection (PI) system. In either case, the fuel must be drawn from a fuel tank and pressurized before being delivered to the DI or PI system. For DI systems, fuel pressures can exceed 300 bar and the high-pressure fuel pumps used to generate these high pressures are typically driven from an engine shaft. The engine shaft rotates continuously while the engine is running but demand for high-pressure fuel is not constant. For example when a vehicle is rapidly accelerating, demand for fuel is high and when the vehicle is coasting downhill, demand for fuel is low. A typical high pressure fuel injection pump includes one or more plungers that reciprocate to pressurize fuel in a compression chamber of the pump. Shaft driven high-pressure fuel pumps are equipped with various means of controlling the quantity of fuel pressurized by the pump to adjust pump output to meet demand for fuel. One known method is to equip the high-pressure fuel pump with a solenoid operated inlet control valve arranged to control the flow of fuel into a pumping chamber of the pump. The inlet control valve is held open during a variable portion of the compression stroke of the pumping plunger, which allows fuel to flow out of the compression chamber back toward an inlet of the pump. Fuel in the compression chamber after the control valve is closed is pressurized and forced through a high-pressure outlet to the fuel injection system.

Such shaft driven fuel pumps represent a significant load on the engine even when demand for fuel is low. In addition, the control valves represent a source of audible noise, particularly at low engine speeds. Fuel pulsations produced by fuel spilled back into the inlet of the pump can propagate in fuel lines and be another source of audible noise.

There is a need for a more efficient fuel injection pump for use in fuel injection systems where the pump is not driven from an engine shaft and is less likely to be a source of audible noise.

SUMMARY OF THE INVENTION

Disclosed embodiments of an electric GDI pump are configured to allow fuel being pumped to cool the electric motor and associated motor control/drive circuit, and cool and lubricate a drive region of a high-pressure pump before passing through an inlet check valve of the high-pressure pump. The rotational speed of an electric GDI pump is de-coupled from the rotational speed of the internal combustion engine. In such a fuel supply system, the quantity of fuel pressurized can be regulated by changing the rotational speed of the electric GDI pump. According to aspects of the disclosure an electric GDI pump is driven by a variable speed direct current motor having a motor housing with a fuel inlet and a motor drive shaft connected to a rotor. The electric GDI pump may incorporate a low-pressure pump driven by one end of the drive shaft and an eccentric drive driven by an opposite end of the drive shaft. A pump drive housing defines a drive chamber surrounding the eccentric drive and is secured to the motor housing by a sealed connection. The eccentric drive coupled to the drive shaft to converts rotation of the drive shaft into reciprocating motion of a pumping plunger that alternately expands and restricts the volume of a pumping chamber. The pumping plunger is reciprocated by the eccentric drive in a plunger bore so that a pumping end of the plunger moves into and away from the pumping chamber. A high pressure-pump body is secured to the pump drive housing and at least partially defines the pumping chamber. An inlet opening is defined between the drive chamber and an inlet of the high-pressure pump. The inlet opening may be defined by the pump body. A particle filter is situated in the inlet opening to remove particles from a flow of fuel entering the high-pressure pump.

Passive inlet and outlet check valves control the flow of fuel through the high-pressure pump. The inlet check valve opens as the plunger moves away from the pumping chamber to draw fuel into the pumping chamber and closes when the plunger is moving into the pumping chamber to compress fuel in the pumping chamber. Fuel passes through the inlet check valve after passing through the inlet opening from the drive chamber. In this high-pressure pump configuration, there is no inlet (quantity) control valve and the pumping chamber is filled to maximum capacity during each charging stroke of the plunger. The outlet check valve closes during a charging stroke of the plunger and opens when the plunger moves into the pumping chamber causing fuel pressure in the pumping chamber to exceed fuel pressure in the fuel injection system downstream of the outlet check valve. The disclosed electric fuel pump may be used in conjunction with any fuel injection apparatus, including direct injection and port injection systems.

A high-pressure outlet connected to the pump body directs pressurized fuel passing through the outlet check valve to a fuel line and into a common rail of a fuel injection system. The disclosed electric GDI pump allows fuel to flow through the electric motor to cool the motor and motor control/drive circuit before the fuel flows through the drive chamber to cool and lubricate the eccentric drive. In some embodiments, fuel flows through a region of the pump surrounding the pumping plunger and plunger bore, to cool and lubricate this region of the high-pressure pump before entering the inlet check valve. A motor control/drive circuit cooperates with an engine control unit (ECU) to regulate the rotational speed of the electric GDI pump to match the supply of pressurized fuel to demand for fuel by an associated internal combustion engine.

DETAILED DESCRIPTION

Figure 1:
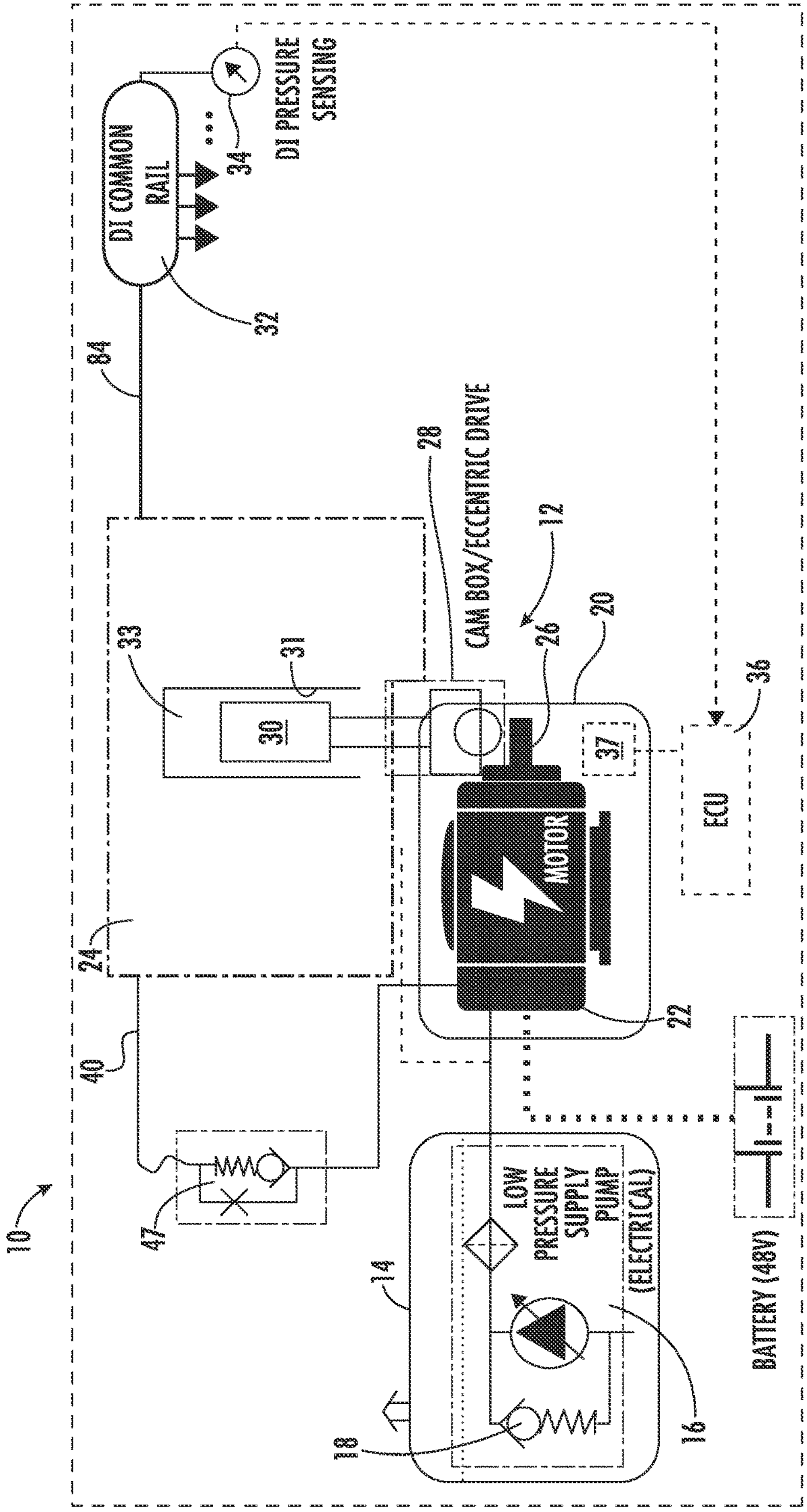
FIG. 1 is schematic illustration of a fuel system for an internal combustion engine incorporating an electric motor driven high pressure fuel pump according to aspects of the disclosure.

FIG. 1 illustrates a representative fuel system 10 incorporating an electric motor driven high pressure fuel pump 12 according to aspects of the disclosure. In some embodiments, the fuel system 10 includes a fuel tank 14 with a low-pressure fuel pump 16 situated in the tank 14. In an alternative embodiment, the low-pressure fuel pump can be driven by the same motor used to drive the disclosed high pressure fuel pump. The low-pressure fuel pump 16 may include a pressure regulating pressure relief valve 18 to regulate pressure of fuel supplied to the electric motor driven high pressure fuel pump 12. Low-pressure fuel is delivered to a housing 20 surrounding the electric motor 22 used to drive the high-pressure fuel pump 24 and low-pressure fuel is circulated through the electric motor 22 to cool the motor during operation of the high-pressure pump 12. The electric motor 22 includes a drive shaft 26 connected to an eccentric drive 28 mounted in a drive housing secured to one end of the motor housing 20. The drive shaft 26 of the electric motor extends from a rotor of the motor 22 into the drive housing 44 where the shaft 26 is coupled to the eccentric drive 28 that converts rotation of the drive shaft 26 into reciprocating motion of a pumping plunger 30. Fuel pressurized by the high-pressure fuel pump 24 is delivered to a direct injection (DI) system common rail 32 equipped with a pressure sensor 34.

One example of an electric motor 22 suitable for driving a high-pressure fuel pump is a brushless direct current (BLDC) motor. The BLDC motor-driven high pressure fuel pump may be configured to operate in a 48 volt, direct current (DC) vehicle electrical system, but other electrical systems may be used. BLDC motors are very durable and can be controlled with a high degree of precision in terms of torque and rotational speed. BLDC motors have a stator composed of groups of coils and a rotor with permanent magnets of alternating polarity. A control circuit 37 applies electrical power to groups of stator coils to generate a rotating magnetic field that acts on the permanent magnets on them rotor to generate torque, as is known in the art. The control circuit 37 is configured to detect the rotational position and speed of the rotor, which allows precise control of the rotational speed and torque of the motor. The control circuit 37 of the BLDC motor is typically incorporated into the BLDC motor where electrical power enters the motor housing 20. The control circuit 37 of the BLDC motor cooperates with an engine control unit (ECU) 36 to coordinate production of pressurized fuel with demand from the associated internal combustion engine. A pressure sensor 34 may be arranged to detect fuel pressure in a common rail 32 of a DI system and this fuel pressure may be one variable employed by the ECU 36 to control the BLDC motor 22. Use of an electric motor 22 to drive a high-pressure fuel pump 24 de-couples the rotational speed of the pump relative to the rotational speed of an associated internal combustion engine. Rotational speed of the electric motor 22 can be used to regulate the quantity of fuel pressurized by the high-pressure fuel pump 24, eliminating the need for complicated solenoid-operated inlet (quantity) control valves. Disclosed embodiments of a high-pressure fuel pump 24 use passive inlet and outlet check valves 47, 50 to control movement of fuel through the pump 24, with the inlet check valve 47 opening during a charging stroke of the pump where the plunger 30 is withdrawn from a pumping chamber 33 and the outlet check valve 50 opening during a pumping stroke where the plunger 30 is advanced toward the pumping chamber 33. An electric motor driven high-pressure fuel pump according to aspects of the disclosure may also eliminate the need to incorporate a pressure relief valve into the pump by permitting greater control over the quantity of fuel pressurized by the high-pressure fuel pump 24, regardless of engine operating conditions (rotational speed, load, etc.).

Many forms of eccentric drive are compatible with the disclosed electric motor driven high-pressure fuel pump 12. In one embodiment, a cam is mounted to a drive shaft of the motor, where the cam has one or more lobes eccentric to the axis of rotation of the drive shaft, and a cam follower 66 is arranged to be moved by the cam in a reciprocating linear motion. A pumping plunger 30 connected to the cam follower 66 reciprocates in a plunger bore 31 to increase and decrease the volume of a pumping chamber 33 at one end of the pumping bore 31. One eccentric drive mechanism for an electric motor driven high pressure fuel pump is disclosed in commonly owned U.S. Pat. No. 10,975,816, entitled Roller Drive Mechanism for GDI Pump. Eccentric drive mechanisms for most known high-pressure fuel pumps are configured to be driven by an engine shaft, and so may be configured to operate at relatively low rotational speeds. According to aspects of the disclosure, an electric motor driven high-pressure fuel pump will operate at rotational speeds potentially much higher than the engine rotational speed and so may need to be modified to work efficiently and quietly at higher rotational speeds.

Heat is generated by power components of the BLDC control circuit 37 and by electrical power applied to stator coils of the motor 22. Fuel is circulated through the motor housing 20 and past the control circuit 37 to absorb heat and cool the motor 22 and control circuit 37. Friction in the eccentric drive 28 and between plunger 30 and bore 31 of the high-pressure pump 24 also generate heat, so fuel is circulated through the drive housing 44 and around components of the high-pressure fuel pump 24 for cooling and lubrication.

Figure 2:
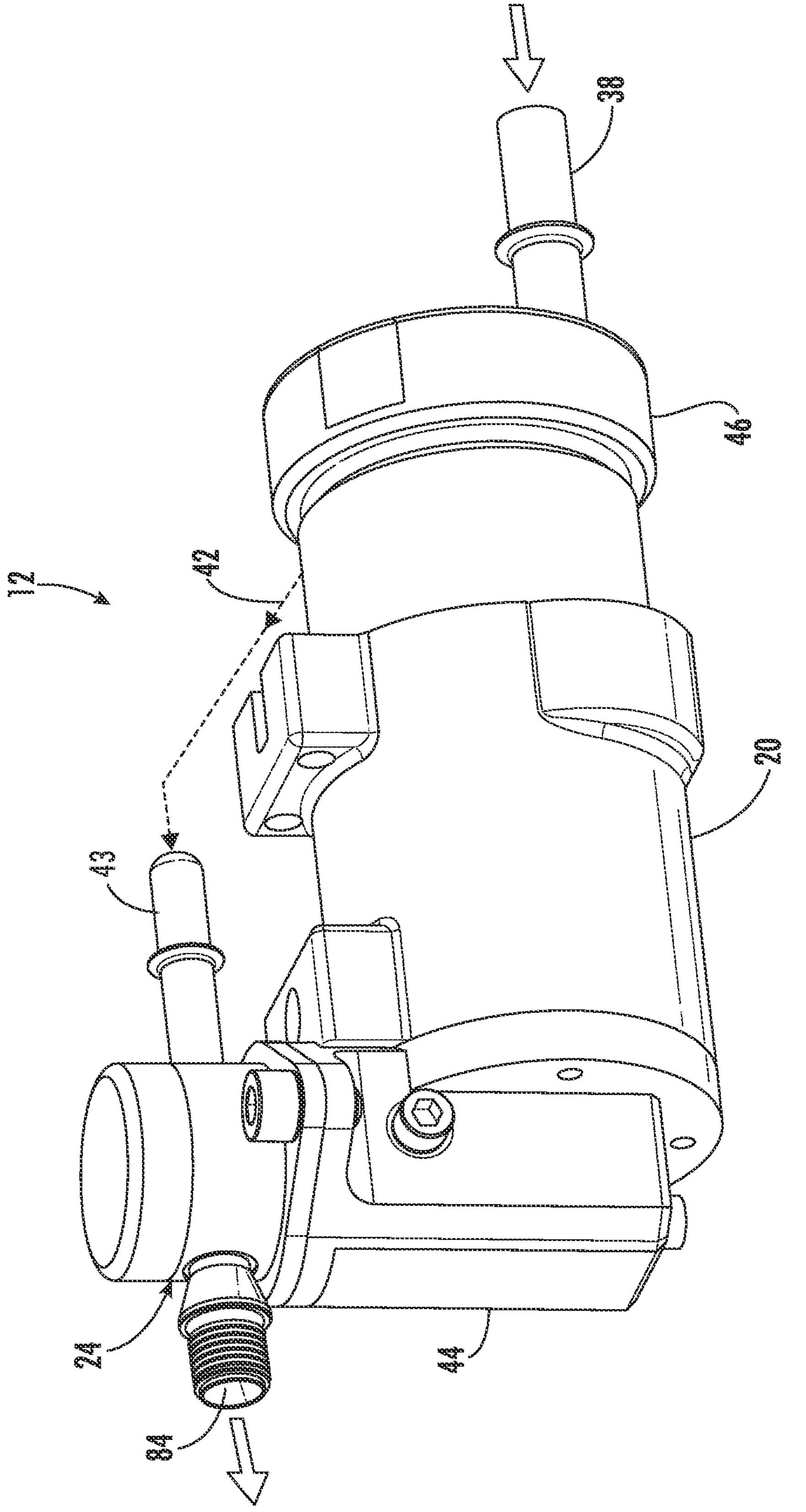
FIG. 2 is an exterior perspective view of one embodiment of an electric motor driven high pressure fuel pump according to aspects of the disclosure.
Figure 3:
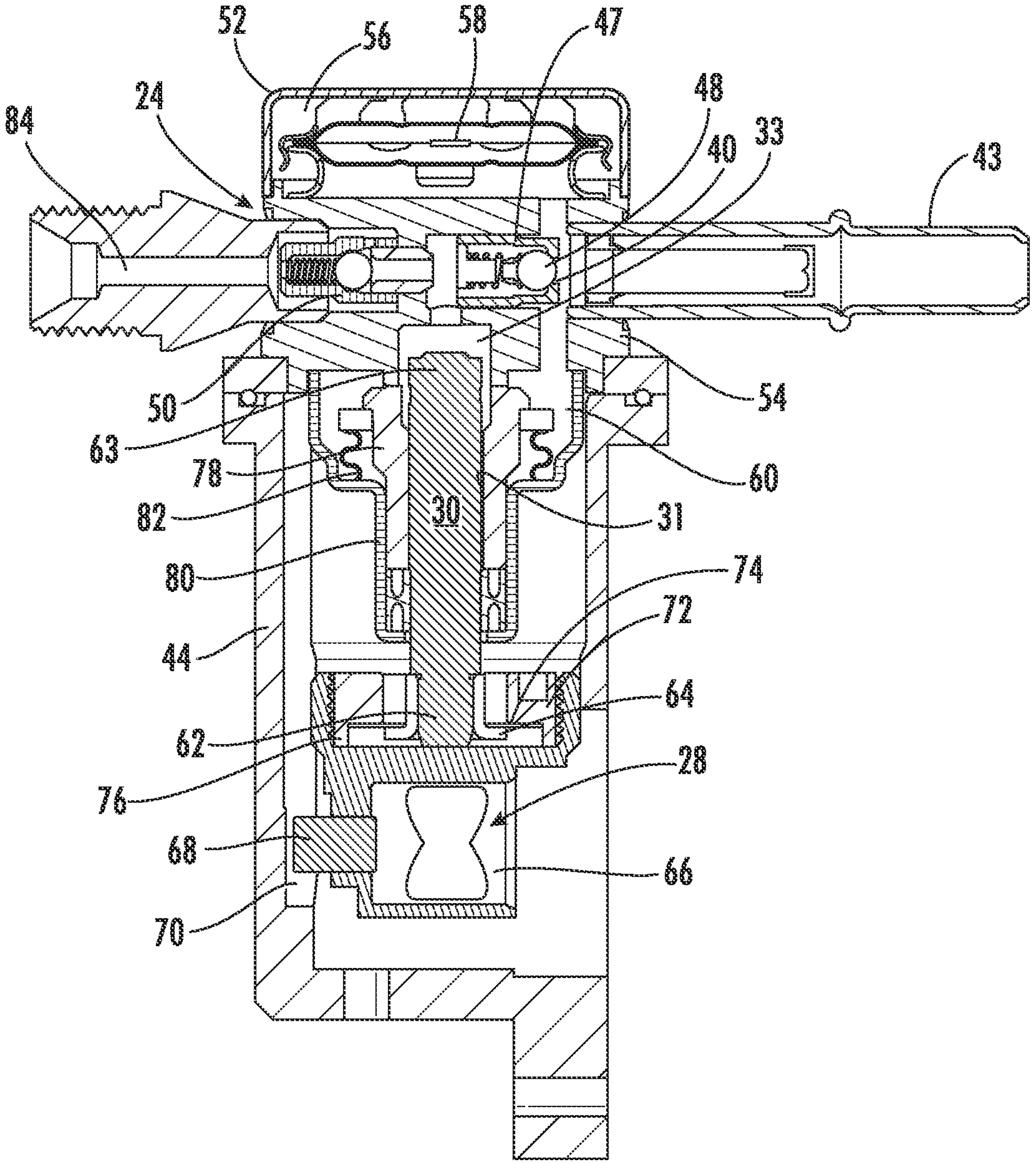
FIG. 3 is a sectional view through a first embodiment of a drive housing, eccentric drive and high-pressure fuel pump according to aspects of the disclosure.

According to aspects of the disclosure, embodiments of a disclosed electric motor driven high-pressure fuel pump (hereafter, “electric GDI pump”) 12 include a sealed motor housing 20 which includes a fuel inlet 38 arranged so that fuel being pumped is circulated around and/or through the electric motor 22 to cool the motor control/drive circuit 37. In the electric GDI pump 12 embodiment of FIG. 2, the motor housing 20 includes a fuel inlet 38 to circulate fuel around and/or through the motor 22 and the high-pressure pump includes a separate fuel inlet 40 for fuel to be delivered to the high-pressure pump 24. In this configuration, the motor housing 20 would also incorporate a low-pressure outlet 42 to route fuel that has flowed through the motor housing 20 to an inlet fitting 43 of the high-pressure pump 24 to supply low pressure fuel to the pump inlet 40. The fuel flow path may route fuel through the drive housing 44 to cool and lubricate the eccentric drive mechanism as well. One drawback to the electric GDI pump 12 configuration of FIGS. 2 and 3 is that this configuration requires low-pressure fuel connections 43, 42 outside the motor/pump housing 20 to complete the fuel flow path. These connections require additional connectors and fluid piping, which add costs, assembly steps and are potential sources of fuel leaks.

Embodiments of an electric GDI pump 12 may incorporate a low-pressure pump 46 driven by the same electric motor that rotates the eccentric drive mechanism 28. In this arrangement, the low-pressure pump 46 may be a gear pump arranged to draw fuel from a fuel tank 14 and pressurize the fuel to a pressure of 3-6 bar and feed fuel at low-pressure to the pump inlet 40 of the high-pressure pump 24. A pump including both the low-pressure and high-pressure fuel pumps 46, 24 may be mounted below the fuel tank so that fuel is fed to the inlet 38 of the low-pressure pump 46 by gravity.

FIG. 3 is a sectional view through a representative eccentric drive mechanism 28 and high-pressure fuel pump 24 configured to be driven by an electric motor according to aspects of the disclosure. The BLDC motor 22 (not shown in FIG. 3) may be configured to operate at rotational speeds up to 13,000 rpm. The inlet check valve 47 is modified to limit movement (stroke) and reduce mass of the valve ball 48, which reduces or eliminates resonance at high reciprocating frequencies of the pumping plunger 30. Similar modifications are made to the outlet check valve 50. Both check valves 47, 50 may employ low-mass ceramic valve balls. A damper cover 52 is fitted to the pump body 54 to define a damper chamber 56 housing at least one gas-filled metal damper 58 configured to absorb pressure pulses. The damper chamber 56 communicates with the pump inlet 40 and absorbs pressure pulses that may cause resonant vibration at high motor/pump operating speeds. One example of high motor/pump operating speeds may be rotational speeds above 8,000 rpm.

Figure 7:
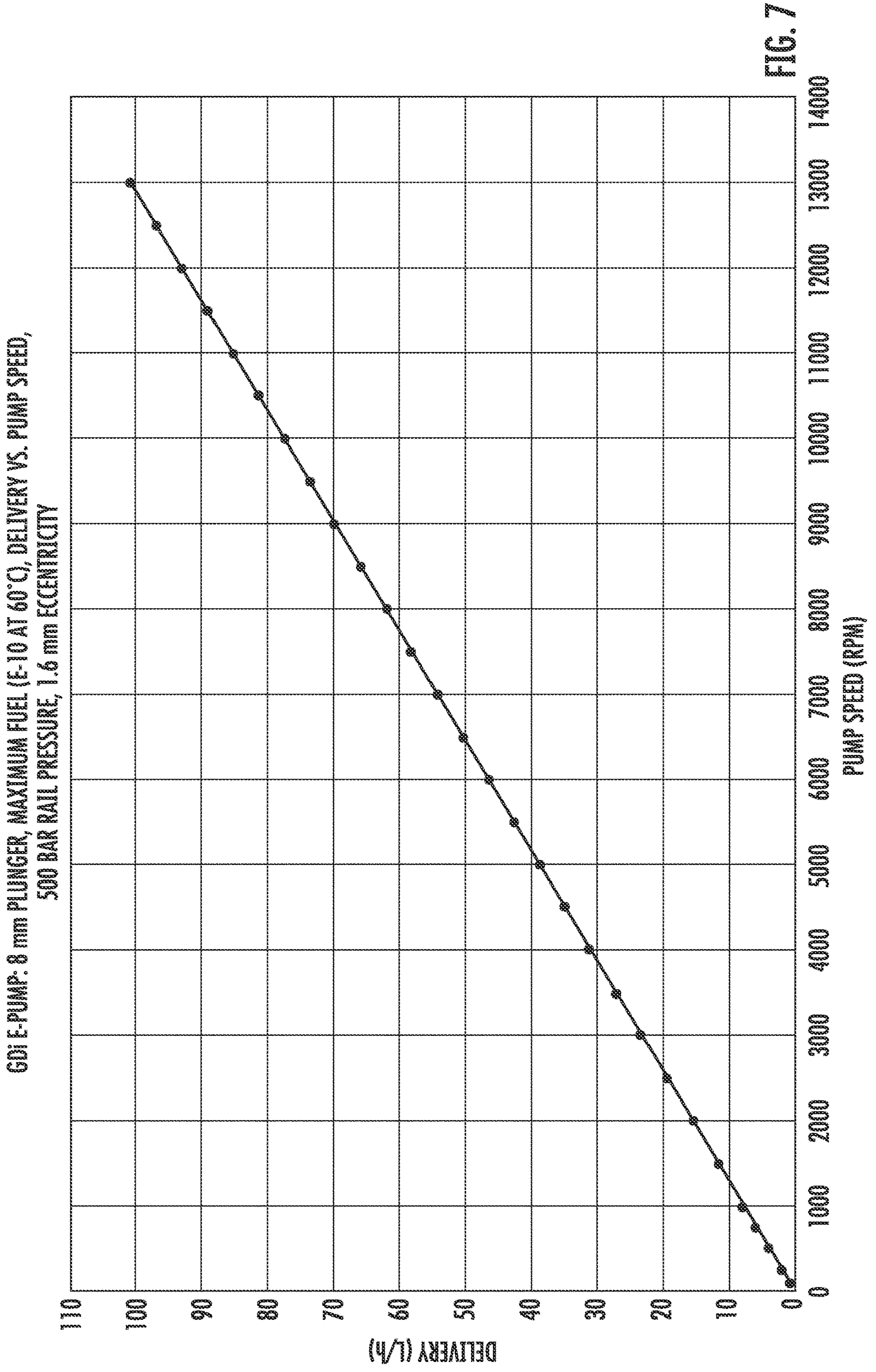
FIG. 7 illustrates a simulated relationship between fuel flow and motor rotational speed in embodiments of the disclosed electric motor-driven high pressure fuel pump.

FIG. 7 illustrates simulated characteristics of an electric GDI pump having a pumping plunger with an 8 mm diameter and a pumping stroke of 3.2 mm (eccentricity 1.6 mm). This pump is configured to deliver 100 L/h @ 13,000 max rpm, @ 500 bar rail pressure. The relationship between quantity of high-pressure fuel output and motor/pump rpm is essentially linear, which means the quantity of high-pressure fuel produced can be controlled using the rotational speed of the BLDC motor. In the electric GDI pump embodiment of FIGS. 2 and 3, the low-pressure pump inlet 40 is in fluid communication with the pump inlet check valve 47, the damper chamber 56 and a low-pressure region 60 surrounding the pumping plunger 30. Connecting the pump inlet 40 to the low-pressure region 60 surrounding the pumping plunger 30 ensures that fuel cools and lubricates the pumping plunger 30 and plunger bore 31.

The driven end 62 of the pumping plunger 30 includes a radially projecting flange 64 permanently secured to the plunger 30 by a press-fit or other known connection. A pumping end 63 of the pumping plunger 30 projects into the pumping chamber 33. As shown in FIG. 3, a cam follower 66 defines a drive socket that receives an eccentric drive or cam attached for rotation with the motor drive shaft 26 (not shown in FIG. 3). One or more follower guides 68 move in axially oriented channels 70 defined by the drive housing 44 to limit movement of the cam follower 66 to axial movements parallel with an axis of the pumping plunger 30. The cam follower 66 defines a recess facing the driven end 62 of the plunger 30. The recess includes a female thread that mates with a plunger-retaining insert 72. The plunger retaining insert 72 defines a shoulder and a thrust washer 74 spans a radial space between the inner limit of the shoulder and an outer limit of the flange 64 on the driven end 62 of the pumping plunger 30. The plunger-retaining insert 72 includes an axially extending rim 76 that defines an installed position of the insert 72 relative to the cam follower 66 and determines the axial position of the thrust washer 74 within the cam follower 66. The thrust washer 74 biases the driven end 62 of the plunger 30 against the cam follower 66 and helps to reduce side loading of the plunger 30 by allowing relative displacement between the driven end 62 of the plunger 30 and the cam follower 66

The high-pressure fuel pump 24 shown in FIG. 3 employs a pump configuration in which the plunger bore 31 is defined by a plunger sleeve 78 separate from the pump body 24, which defines an upper part of the pumping chamber 33. An upper end 77 of the plunger sleeve 78 is biased against a sealing surface 75 on the pump body 24 surrounding the pumping chamber 33 to maintain a sealed connection between the plunger sleeve 78 and the pump body 24. A sleeve retainer 80 surrounds the plunger sleeve 78 and a resilient load ring 82 is biased between a shoulder inside the sleeve retainer 80 and a shoulder on the plunger sleeve 78 to maintain a pre-determined pressure on the connection between the plunger sleeve 78 and the pump body 24 as described in commonly owned U.S. Pat. No. 8,579,611. The sleeve retainer 80 is connected to the pump body 24 in a fixed position by a weld or other robust connection. As the pumping end 63 pumping plunger 30 is reciprocated in the plunger bore 31, the volume of the pumping chamber 33 is alternately expanded and contracted. While the plunger 30 is withdrawn from the pumping chamber 33, the inlet check valve 47 is opened and fuel flows from the inlet 40 into the pumping chamber 33. While the plunger is advanced into the pumping chamber 33, the inlet check valve 47 is closed and the outlet check valve 50 is opened, allowing pressurized fuel to flow out of the high-pressure pump 24 through the high-pressure outlet 84. The check valves operate in a conventional manner, e.g., the check valves 47, 50 open when the pressure upstream of the check valve is greater than the pressure downstream of the check valve and close when pressure downstream of the check valve is greater than pressure upstream of the check valve.

Figure 4:
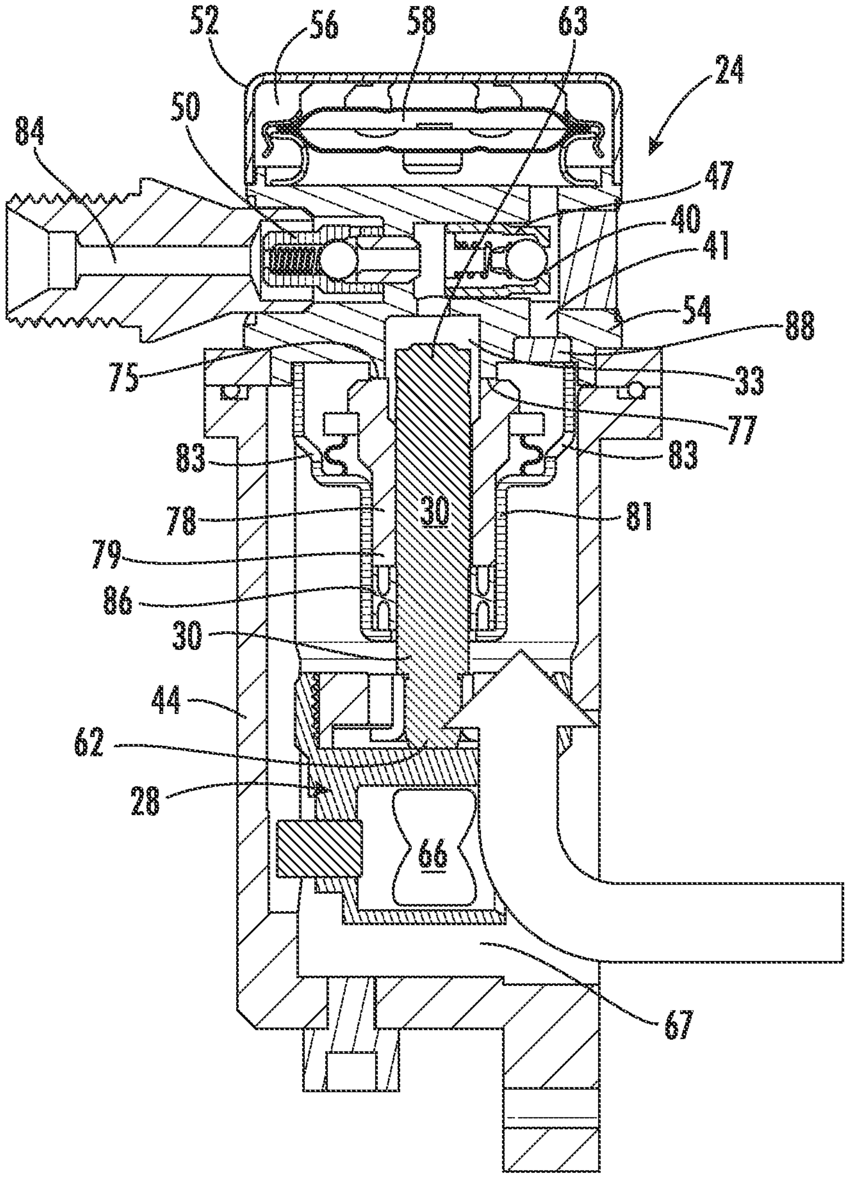
FIG. 4 is a sectional view through an alternative embodiment of a drive housing, representative eccentric drive mechanism, and high-pressure pump according to aspects of the disclosure.
Figure 5:
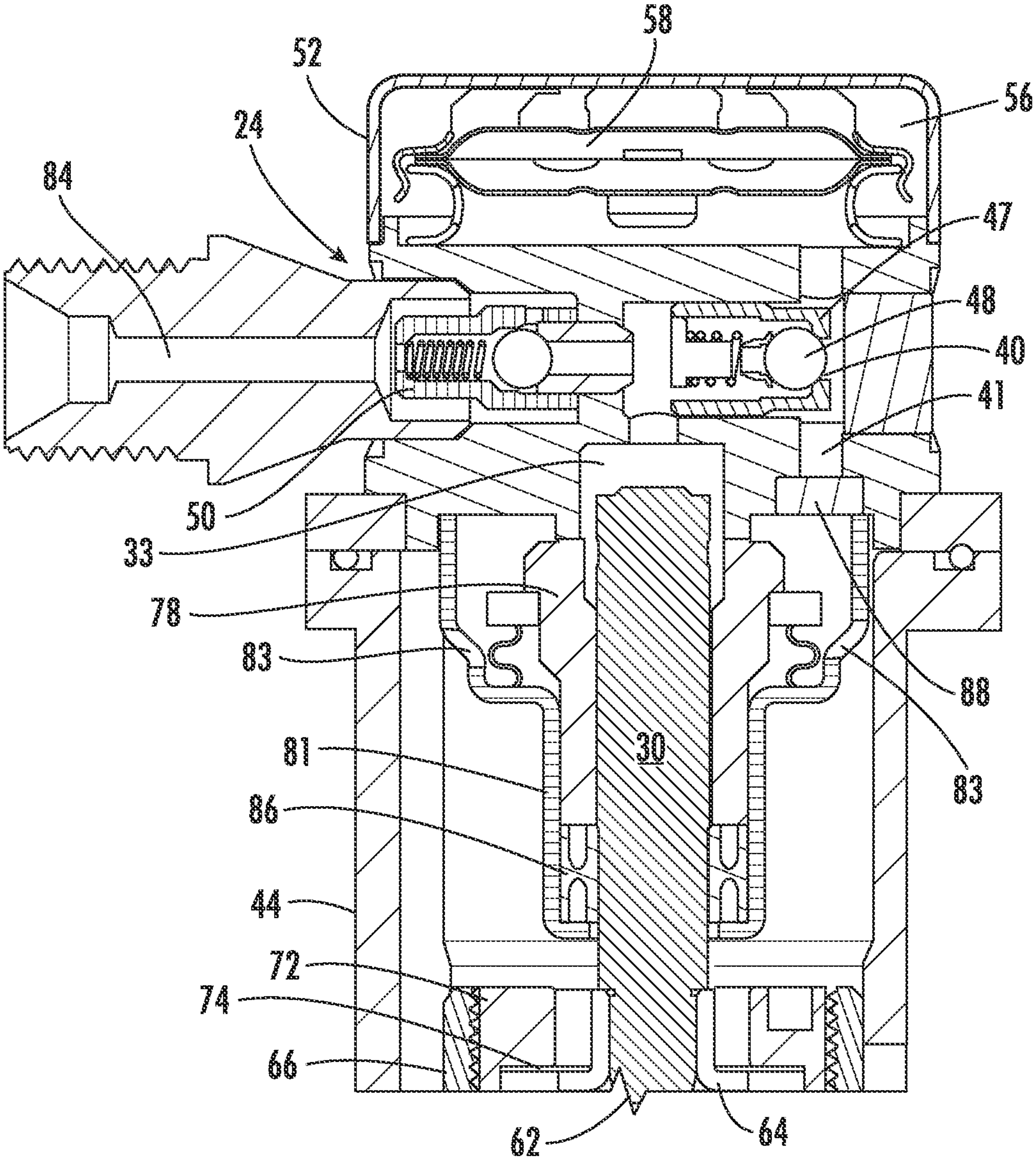
FIG. 5 is an enlarged sectional view through the high-pressure pump of FIG. 4.
Figure 6:
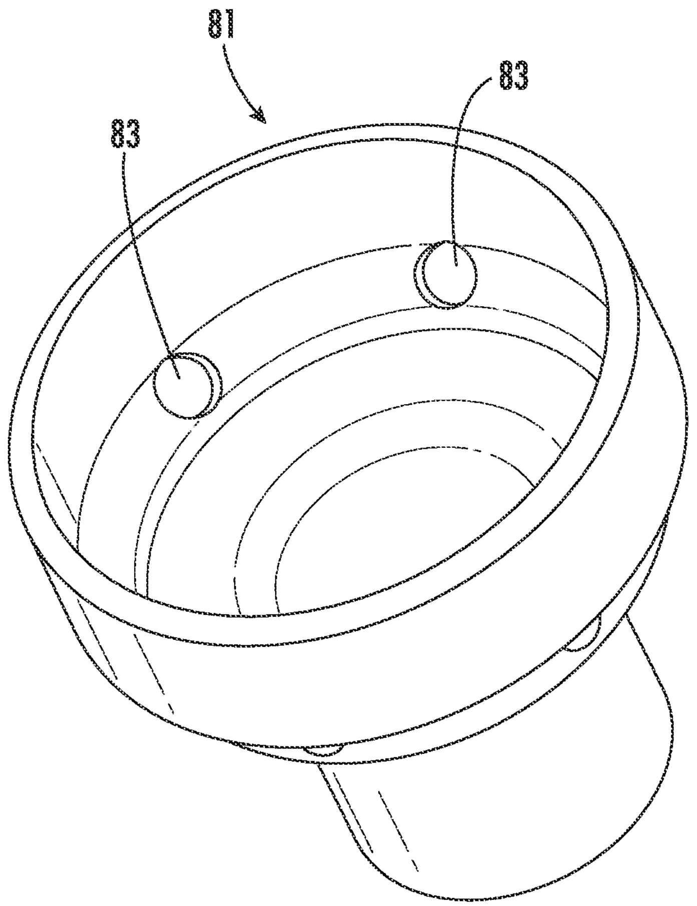
FIG. 6 is an enlarged perspective view of a seal retainer for use in conjunction with the high-pressure fuel pump of FIGS. 3-5.

FIGS. 4-6 illustrate an alternative embodiment of an electric GDI pump according to aspects of the disclosure where low-pressure fuel enters the motor housing 20 at the fuel inlet 38 shown in FIG. 2, flows through the motor housing 20 to cool the motor and control/drive circuit before passing through the drive housing 44 and into the high-pressure pump 24. In an embodiment where the low-pressure pump 46 is driven by the same motor 22 as the high pressure pump 24, fuel flows first through the low pressure pump 46 then through the motor housing 20 and then through the drive chamber 67 to the pump inlet 40. Many components of the alternative embodiment shown in FIGS. 4-6 are shared with the previously described embodiment of FIGS. 2 and 3. These previously described components are given the same reference numerals in FIGS. 4-6 and will not be described again. According to the embodiment of FIGS. 4-6, the motor housing 20 is connected to the drive housing 44 with a sealed connection. The pump body 54 of the high-pressure pump 24 is connected to the drive housing 44 by another sealed connection that may incorporate an O-ring seal or gasket. Components of the electric GDI pump 12 are modified to allow fuel to flow from the drive chamber 67 to the pump inlet 40 by a flow path within the drive housing 44 and pump body 24. This electric GDI pump 12 configuration eliminates a separate low-pressure inlet connection for the high-pressure pump 24 and instead routes low-pressure fuel in series through the BLDC motor 22, drive housing 44 and then to the inlet check valve 47 of the high-pressure pump 24.

Fuel flow through the drive housing 44 and high-pressure pump 24 is shown in FIG. 4. Fuel leaving the motor housing enters the drive housing 44 and flows around the eccentric drive 28. Fuel flows from the drive chamber 67 (the area within the drive housing 44 surrounding the eccentric drive 28) to an area surrounding the driven end 62 of the pumping plunger 30, the sleeve retainer 81, and plunger sleeve 78 in which the plunger 30 reciprocates to cool and lubricate this part of the high-pressure pump 24. In FIGS. 4 and 5, a plunger seal 86 is shown surrounding a lower end 62 of the pumping plunger 30 below a lower end 79 the plunger sleeve 78, but this seal is not necessary in an electric GDI pump where fuel is used to cool and lubricate the eccentric drive 28, plunger sleeve 78 and pumping plunger 30. A seal in this position is typically employed to separate engine oil or other lubricant used to lubricate the pump drive from the fuel being pumped. It will be apparent that in an electric GDI pump where fuel flows through the drive chamber 67 and around the plunger sleeve 78, there is no need to separate these areas from each other.

In the electric GDI pump of FIGS. 4-6, the sleeve retainer 81 includes a plurality of openings 83 that permit fuel to flow radially inward through the sleeve retainer 81 from the drive region 67. In the electric GDI pump embodiment of FIGS. 4-6, the pump body 24 defines an inlet opening 41 communicating between the drive chamber 67 defined by the drive housing 44 and the pump inlet 40. A particle filter 88 is arranged in the inlet opening 41 to prevent particles from passing through the inlet check valve 47 of the high-pressure pump 24, which can potentially damage downstream fuel system components such as fuel injectors. The opening supporting the particle filter and defining the inlet opening is situated between the drive chamber 67 and the inlet check valve 47 and may be defined by either the drive housing 44 or the pump body 54. The pump inlet 40 includes an inlet check valve 47 that opens when the fuel pressure in the pumping chamber 33 is reduced by retraction of the pumping plunger 30 during a charging stroke and closes when pressure in the pumping chamber 33 is greater than at the pump inlet 40. In this pump configuration, the pumping chamber 33 is filled to maximum capacity on each charging stroke. The pump outlet includes an outlet check valve 50 that opens when pressure in the pumping chamber 33 exceeds pressure in the high-pressure outlet 84 connected to the DI common rail. A damper chamber 56 spans an upper end of the pump body 24 and contains at least one gas-filled metal damper 58. The damper chamber 56 is in fluid communication with the pump inlet 40 and absorbs pressure pulses at the pump inlet 40. According to aspects of the disclosure, both the inlet and outlet check valves 47, 50 are incorporated inside the pump body 24, eliminating the need to incorporate check valves into the inlet and outlet fittings of the electric GDI pump 12.

What is claimed:

1. A high-pressure fuel pump comprising:

a variable speed direct current motor having a motor housing (20) with a fuel inlet (38) at a motor housing first end, and a shaft (26) extending from a motor housing second end axially opposite said motor housing first end;

a pump drive housing (44) secured to the motor housing (20) second end by a sealed connection and defining a drive chamber (67);

an eccentric drive (28) in said drive chamber (67) and coupled to the shaft (26) to convert rotation of the shaft (26) into reciprocating motion;

a plunger (30) reciprocated by the eccentric drive (28) in a plunger bore (31) so that a pumping end (63) of the plunger (30) moves into and away from a pumping chamber (33);

a pump body (54) secured to the pump drive housing (44) and at least partially defining the pumping chamber (33), said pump body (54) defining an inlet opening (41) between the drive chamber (67) and a pump inlet (40);

a pumping sleeve (78) defining the plunger bore (31);

a sleeve retainer (81) surrounding said pumping sleeve (78) and secured to said pump body (54) and extending into the drive chamber (67) wherein the sleeve retainer (81) defines at least one fuel flow opening (83) fluidly connecting the drive chamber (67) to the inlet opening (41);

a resilient load ring (82) arranged within said sleeve retainer (81) to bias an upper end (77) of the pumping sleeve (78) against a sealing surface (75) on said pump body (54) surrounding the pumping chamber (33);

an inlet check valve (47) in the pump inlet (40) and arranged to open as the plunger (30) moves away from the pumping chamber (33) to draw fuel into the pumping chamber (33) and close when the plunger (30) is moving into the pumping chamber (33) to compress fuel in the pumping chamber (33), fuel passing through the inlet check valve (47) passing through the inlet opening (41) from the drive chamber (67);

an outlet check valve (50) arranged to close when the plunger (30) moves away from the pumping chamber (33) and open when the plunger (30) moves into the pumping chamber (33) and pressure downstream of the outlet check valve (50) is less than a pressure in the pumping chamber (33);

a high-pressure outlet (84) connected to the pump body (54) to receive pressurized fuel passing through said outlet check valve (50), wherein fuel flows into the fuel inlet (38), through the variable speed direct current motor into the pump drive housing (44) and from the pump drive housing (44) through the inlet opening (41) to the pump inlet (40), said fuel cooling the variable speed direct current motor and cooling and lubricating the eccentric drive (28) before entering the pumping chamber (33).

2. The high-pressure fuel pump of claim 1, comprising a filter (88) arranged in said inlet opening (41).

3. The high-pressure fuel pump of claim 1, wherein said sleeve retainer (81) supports a plunger seal (86) at a lower end of the plunger sleeve (78).

4. The high-pressure fuel pump of claim 1, comprising a damper chamber (56) connected to the pump body (54) and fluidly connected to the pump inlet (40), and at least one gas-filled metal damper (58) arranged in said damper chamber (56).

5. The high-pressure fuel pump of claim 1, wherein the quantity of fuel pressurized by the pump (24) is varied by altering a rotational speed of the variable speed direct current motor.

6. The high-pressure fuel pump of claim 1, wherein said variable speed direct current motor is a brushless direct current motor (22).

7. A fuel delivery system for an internal combustion engine, the fuel delivery system (10) comprising:

a high-pressure fuel pump (24) of claim 1, and a low-pressure fuel pump (16) connected to draw fuel from a fuel tank (14) and deliver fuel to the pump inlet (40).

8. A high-pressure fuel pump comprising:

a variable speed direct current motor (22) having a motor housing (20) with a first end and a second end, with a fuel inlet (38) located at said first end, and a drive shaft (26) at said second end;

a pump drive housing (44) having a sealed connection to the motor housing (20), said drive housing (44) defining a drive chamber (67);

an eccentric drive (28) in the drive chamber (67) and coupled to the drive shaft (26), the eccentric drive (28) comprising:

a drive follower (66) defining a recess including a female thread;

a plunger-retaining insert (72) including a male thread that mates with the drive follower (66) female thread, said plunger-retaining insert (72) including a radially inward projecting shoulder having an inner limit; and a thrust washer (74) beneath the inward projecting shoulder and extending radially inward of the inner limit;

a pumping plunger (30) with a driven end (62) connected to the eccentric drive (28) to convert rotation of the drive shaft (26) into reciprocating motion of the pumping plunger (30) in a plunger bore (31) that alternately expands and restricts the volume of a pumping chamber (33) by a pumping end (63) of the pumping plunger (30) moving into and away from the pumping chamber (33), the driven end (62) of the pumping plunger (30) includes a radially outward projecting flange (64) permanently secured to the driven end (62) of the pumping plunger (30), said flange (64) retained within the recess defined by the drive follower (66) by the thrust washer (74), which spans a radial gap between the inner limit of the inward projecting shoulder and an outer limit of the radially outward projecting flange (64);

a pump body (54) having a sealed connection to the pump drive housing (44) and partially defining the pumping chamber (33);

an inlet opening (41) fluidly connecting the drive chamber (67) to a pump inlet (40);

an inlet check valve (47) located within the pump inlet (40) that opens as the pumping plunger (30) moves away from the pumping chamber (33) to draw fuel into the pumping chamber (33), and closes as the pumping plunger (30) moves into the pumping chamber (33) to compress fuel in the pumping chamber (33) enabling fuel to pass through the inlet check valve (47) after passing through the inlet opening (41) from the drive chamber (67);

an outlet check valve (50) that closes as the pumping plunger (30) moves away from the pumping chamber (33), and opens as the pumping plunger (30) moves into the pumping chamber (33) when fuel pressure in the pumping chamber (33) exceeds fuel pressure in the fuel system downstream of the outlet check valve (50);

wherein fuel flows from the fuel inlet (38) through the motor housing (20), the drive chamber (67) and the inlet opening (41) to the pumping chamber (33).

9. The high-pressure fuel pump of claim 8, comprising a filter (88) arranged between the drive chamber (67) and the pump inlet (40).

10. The high-pressure fuel pump of claim 9, further comprising the filter (88) arranged within said inlet opening (41).

11. The high-pressure fuel pump of claim 8, comprising a plunger sleeve (78) defining the plunger bore (31), a sleeve retainer (81) surrounding said plunger sleeve (78), secured to said pump body (54) and extending into the drive chamber (67), a resilient load ring (82) arranged within said sleeve retainer (81) to bias an upper end (77) of the plunger sleeve (78) against a sealing surface (75) on said pump body (54) surrounding the pumping chamber (33).

12. The high-pressure fuel pump of claim 11, wherein the sleeve retainer (81) defines at least one fuel flow opening (83) fluidly connecting the drive chamber (67) to the inlet opening (41).

13. The high-pressure fuel pump of claim 11, wherein said sleeve retainer (81) supports a plunger seal (86) at a lower end (79) of the plunger sleeve (78).

14. The high-pressure fuel pump of claim 8, comprising a damper chamber (56) connected to the pump body (54) and fluidly connected to the pump inlet (40), and at least one gas-filled metal damper (58) arranged in said damper chamber (56).

15. The high-pressure fuel pump of claim 8, wherein the quantity of fuel pressurized by the pump (24) is varied by altering a rotational speed of the variable speed direct current motor.

16. The high-pressure fuel pump of claim 8, wherein said variable speed direct current motor is a brushless direct current motor (22).

17. The high-pressure fuel pump of claim 8, wherein the plunger-retaining insert (72) includes an axially extending rim (76) that defines an installed position of the insert (72) relative to the drive follower (66) and determines the axial position of the thrust washer (74) within the drive follower (66), said thrust washer (74) biases the driven end (62) of the plunger (30) against the drive follower (66).

* * * * *